(12) United States Patent
Shoykhet

(10) Patent No.: US 6,351,045 B1
(45) Date of Patent: Feb. 26, 2002

(54) CROYOGENIC ROTARY TRANSFER COUPLING FOR SUPERCONDUCTING ELECTROMECHANICAL MACHINE

(75) Inventor: Boris A. Shoykhet, Beachwood, OH (US)

(73) Assignee: Reliance Electric Technologies, LLC, Thousand Oaks, CA (US)

(*) Notice: Subject to any disclaimer, the term of this patent is extended or adjusted under 35 U.S.C. 154(b) by 0 days.

(21) Appl. No.: 09/409,149

(22) Filed: Sep. 30, 1999

(51) Int. Cl.[7] .................................................. H02K 9/00
(52) U.S. Cl. ............................. 310/52; 310/54; 310/56; 310/58; 310/59; 310/61; 310/60 A
(58) Field of Search ............................... 310/52, 54, 55, 310/56, 57, 58, 59, 60 A, 61; 335/216, 300; 62/505

(56) References Cited

U.S. PATENT DOCUMENTS

| | | | |
|---|---|---|---|
| 3,904,901 A | * | 9/1975 | Renard et al. ............... 310/52 |
| 4,001,617 A | * | 1/1977 | Boyer ........................ 310/64 |
| 4,101,793 A | * | 7/1978 | Berthet et al. ............... 310/52 |
| 4,134,037 A | * | 1/1979 | Berthet et al. ............... 310/52 |
| 4,208,598 A | * | 6/1980 | Popov et al. ................ 310/64 |

OTHER PUBLICATIONS

"Superconducting Generator Design," EPRI EL–663, Project 429–2, vol. 1, Final Report, pp. 2–91–2–93, General Electric Company, Mar. 1978.

* cited by examiner

Primary Examiner—Nestor Ramirez
Assistant Examiner—Thanh Lam
(74) Attorney, Agent, or Firm—Adam J. Forman; John J. Horn; William R. Walbrun

(57) ABSTRACT

A cryogenic rotary transfer coupling for a superconducting electromechanical rotating machine delivers supply flow from a cryogenic cooler to a rotor so as to cool the superconducting coils. The flow is then returned to the cooler and recirculated throughout the system. The structure includes a relative motion gap between stationary and rotating portions of the coupling. The gap is configured to greatly simplify the manufacture of the coupling while 1) being compatible with cooling systems having both cool return flow capability and warm return flow capability and 2) maintaining a high efficiency for the coupling.

15 Claims, 3 Drawing Sheets

CROYOGENIC ROTARY TRANSFER COUPLING FOR SUPERCONDUCTING ELECTROMECHANICAL MACHINE

BACKGROUND OF THE INVENTION

1. Field of the Invention

The present invention relates to electromechanical machines and, more particularly, relates to a system for maintaining superconducting coils of a rotor at a desired temperature.

2. Discussion of the Related Art

Electromechanical machines such as generators and motors include rotor and stator windings that create a magnetic field to rotate the rotor. Synchronous motors are well known in the art as comprising a rotor that rotates as a result of magnetic flux created between an armature winding and a stator winding. Synchronous motors having superconducting rotor coils are unique in that the coils operate without any resistance to electrical current. As a result, higher current densities may be achieved that are not possible in conventional conductors which, in turn, allows for stronger magnetic fields in electromechanical machines. These motors therefore have a notably higher efficiency than conventional motors.

Presently, low temperature superconducting coils are known to operate below approximately 10° K., and high temperature superconducting coils are known to operate above approximately 30° K. If the operating temperature rises significantly above the normal operating temperature for the superconductor, the coil will act as a conventional conductor, and electric losses will occur within the rotor. It is therefore important to design a coolant system that maintains the superconducting coil at its designed temperature.

In present high temperature superconducting devices, a cryogenic rotary transfer coupling delivers a coolant from a stationary cryogenic cooler to the rotor, thereby cooling the rotor coils, and returns warm coolant to the cooler. Because portions of the coupling rotate during operation, and other portions are stationary, a relative motion gap is formed between the rotating and stationary parts. This gap is a significant path for parasitic heat leakage into the coupling. Present relative motion gap arrangements can result in warmer flow than necessary returning to the cryogenic cooler, thereby decreasing the efficiency of the coupling. Additionally, the complex physical orientation of the annular gap adds cost and complexity to the rotor assembly during manufacturing, and requires tighter tolerances of the machined parts.

Additionally, in cooling systems that use a liquid helium supply flow and a gaseous helium return flow, a large temperature differential results between the two flows. As a result, significant conduction may occur between the outer walls of the supply tube and the outer walls of the return tube, thereby decreasing the efficiency of the overall cooling system.

The need has therefore arisen to provide a cooling system for a superconducting rotor that does not incorporate the difficulties in manufacturing and efficiency associated with prior art cooling systems.

OBJECTS AND SUMMARY OF THE INVENTION

It is therefore a first object of the present invention to provide a cryogenic transfer coupling within a superconducting rotor having an annulus that permits the transfer coupling to be manufactured by a simple and cost-effective manufacturing process.

It is a second object of the invention to provide a cryogenic transfer coupling within a superconducting rotor having a relative motion gap that does not materially adversely affect the efficiency of the coupling.

It is a third object of the invention to manufacture a cooling system incorporating the above two objects that further permits the temperature of the return flow to be either slightly greater or significantly greater than the temperature of the supply flow.

In accordance with a first aspect of the invention, a cryogenic rotary transfer coupling is provided for delivering a cryogenic coolant, such as gaseous helium, from a cryogenic cooler to a supply flow path that extends axially through a rotor shaft, thereby permitting the coolant to enter the rotor and cool the superconductive coils. The coolant then returns to the cooler via a return flow path. Both the supply and the return flow paths have stationary parts connected to the cooler, and rotating parts extending into the rotor. A relative motion gap is therefore formed between the stationary and rotating parts of the coupling. Both stationary and rotating walls of the gap provide a solid conduction path from the ambient environment to the cold part of the coupling. Also the coolant filling the gap may contribute to heat leakage to the cold part via convection. In order to minimize this parasitic heat leakage, at least a portion of the gap is a narrow and long annulus bounded by two concentric thin wall tubes. The tube axis coincides with an axis of rotation, and both tubes are vacuum insulated. Depending on the coupling design, the relative motion gap may be continuous or it may comprise a plurality of segments. The coupling is designed such that every straight line extended from the rotor axis radially outwardly and perpendicularly to the axis will cross the relative motion gap no more than once. This design of the relative motion gap reduces the need for inserts and spacers that are necessary with couplings having other types of relative motion gaps.

In accordance with a second aspect of the invention, a plurality of vacuum cavities exists within the coupling, thereby eliminating heat transfer that would otherwise increase the temperature of the supply and return flows. Additionally, the temperature gradient within the gap is such that the temperature of the fluid flowing through the gap to be returned to the cooler is not increased significantly by the parasitic heat leak. The relatively cool return flow thereby reduces the energy needed to sufficiently cool the return flow and increasing the overall efficiency of the system.

In accordance with a third aspect of the invention, one embodiment is designed to accommodate cooling systems having a return flow of only a few degrees greater than the supply flow, thereby minimizing the concern for heat loss due to conduction between the return flow and the supply flow. In a second embodiment, the potential for conductive heat loss between the return flow and the supply flow is minimized, thereby accommodating cooling systems having return flow temperatures that are significantly greater than the supply flow temperature.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Pursuant to a preferred embodiment of the invention, a rotor assembly is provided having superconducting coils disposed therein. The rotor assembly is connected to a cryogenic transfer coupling to maintain the superconducting coils at their operating temperature. Specifically, a cryogenic cooler is connected to a supply flow path that extends into the rotor shaft to cool the superconducting coils with a cryogenic fluid such as gaseous helium. A return flow path is connected to the supply flow path at one end and extends through the rotor shaft and is connected to the cryogenic cooler at a second opposite end. The cryogenic cooler cools the return flow to the desired temperature of the coils, and recirculates the coolant throughout the system. A caging wall encloses a rotating vacuum, is disposed radially inwardly of an outer wall of the rotor shaft, and defines the radially inward rotating boundary of the coupling. A stationary outer vacuum wall is disposed radially inwardly of the caging wall and surrounds another vacuum cavity between the return flow path and a relative motion gap formed between the rotating caging wall and stationary outer vacuum wall. The gap features the property that every straight line extended from the axis of rotation radially outwardly and perpendicularly to the axis crosses the relative motion gap only once. Additionally, the gap is constructed such that it does not reverse its direction of axial extension. Because of the relatively simple construction of the gap, the manufacturing process is more reliable and efficient, and is less costly than those of present cryogenic transfer couplings.

Figure 1:
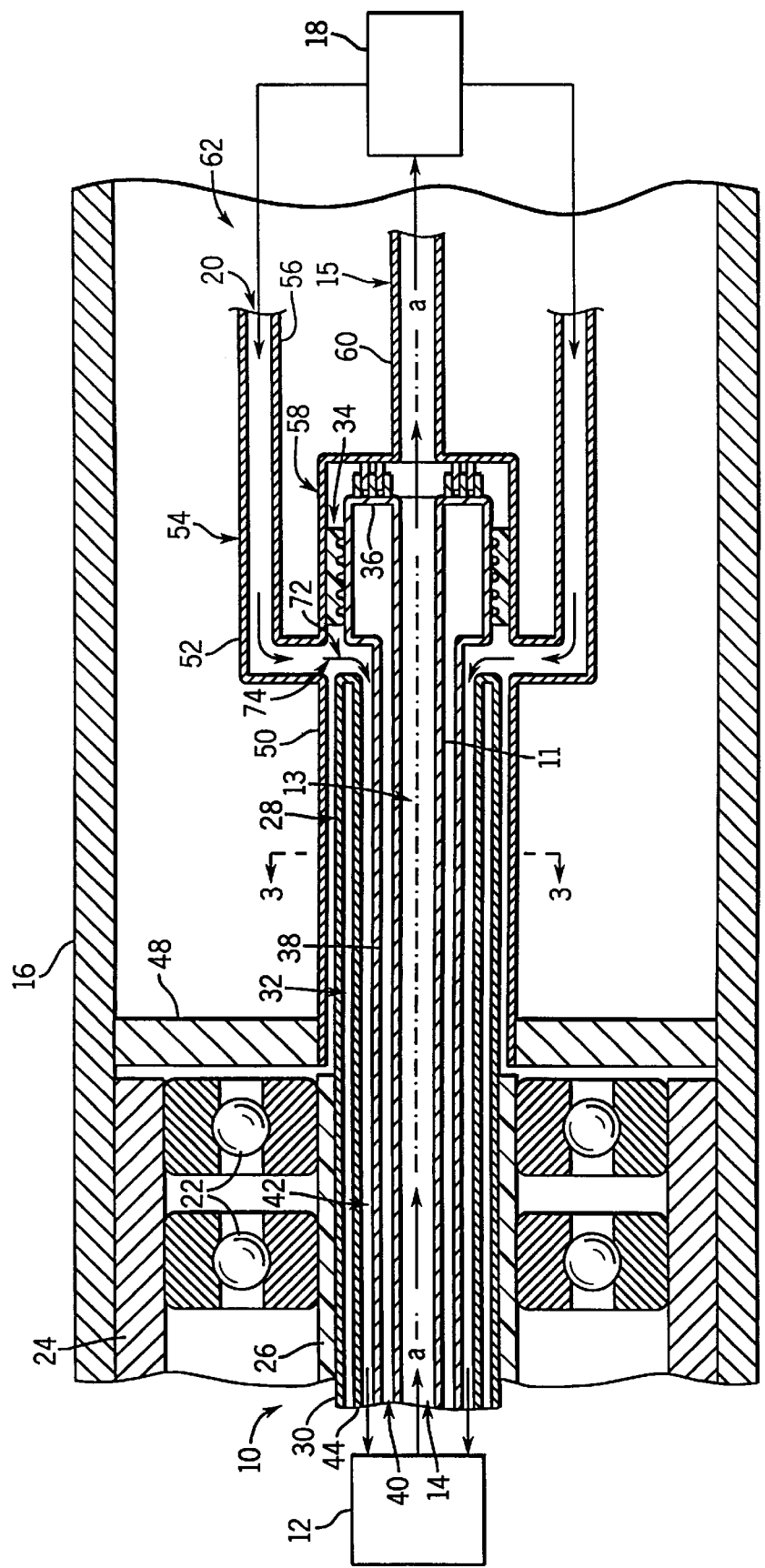
FIG. 1 shows fragmentary side sectional elevation view of a rotor having a cryogenic transfer coupling constructed in accordance with a preferred embodiment of the invention.
Figure 3:
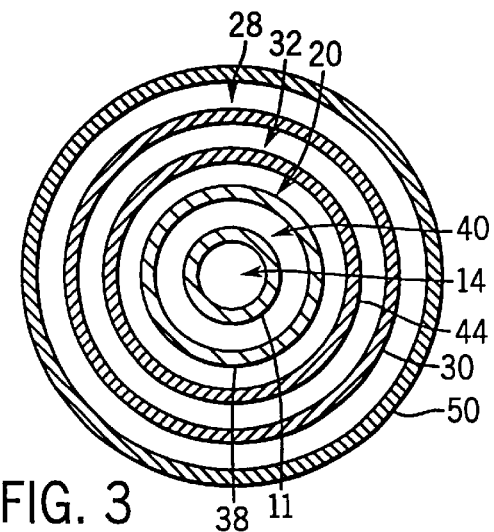
FIG. 3 shows a sectional end elevation view of the cryogenic transfer coupling of FIG. 1.

Referring to FIGS. 1 and 3, a cryogenic transfer coupling 10 delivers coolant from a cryogenic cooler 12 connected to a supply flow path 14 that extends into a rotor shaft 16 and is connected to a return flow path 20. The cryogenic coolant is circulated throughout the cooling system, thereby cooling coils (not shown) of a rotor 18 in a known manner. The rotor shaft 16 is generally cylindrical and contains generally annular internal structures unless otherwise indicated that rotate and are generally symmetrical about an axis of rotation a—a.

In a high temperature superconducting rotating machine constructed in accordance with the preferred embodiment, the coolant comprises gaseous helium at a temperature of approximately 30° K. However, any fluid capable of cooling the coils inside the rotor 18 to their desired temperature could be used. Depending upon the chosen heat exchanger used to cool the superconducting coils, the return flow could be as little as only a few degrees above the temperature of the supply flow or could be significantly warmer. The embodiment of FIG. 1 is designed to accommodate return flow temperatures that are only slightly higher, for example by 10° K., than the supply flow temperature.

The supply flow path 14 comprises 1) a stationary portion 13 located axially upstream of a seal 34 to be described below, and 2) a rotating portion 15 located axially downstream of the seal. (The terms "axially downstream" and "upstream" are used throughout the disclosure to identify a direction of extension corresponding to the direction of the supply flow. Additionally, because the preferred embodiment comprises generally cylindrical and annular objects, directions of travel are referred to as being "radial" or "axial". However, the preferred embodiment should not be limited to such structures, and the directions of travel and extension may also be properly interpreted as being lateral or longitudinal respectively in non-cylindrical, non-annular embodiments.)

Once the coolant has circulated through the rotor 18, it returns through a return flow path 20 and is then transferred back to the cryogenic cooler 12 to be again cooled and recirculated through the cooling system.

The rotor shaft 16 rotates about roller bearings 22 during operation in a known manner. A wall 24 is disposed between an outer race of the bearing 22 and rotor shaft 16, and wall 26 is disposed between a radially inward portion of the bearing 22 and a stationary outer wall 30 of a vacuum cavity 32, thereby providing support for wall 30. An annular wall 11, defining the stationary portion 13 of the supply flow path 14, extends axially downstream until turning radially outwardly and then axially upstream, and connecting with a stationary inner seat 36 for the seal 34. Wall 30 extends axially downstream, crosses the return flow path 20, and forms the inner seat 36. At least one opening 72 exists in stationary wall 30 to permit the return flow to enter a stationary portion 42 of the return flow path 20. Radially inwardly and axially upstream of inner seat 36 is an outer wall 38 of a vacuum cavity 40. The vacuum cavity 40 prevents heat transfer due to convection between the return flow path 20 and the supply flow path 14.

Wall 38 also forms an inner annular wall of the stationary portion 42 of return flow path 20. Radially outwardly from wall 38 is an outer annular wall 44 of the stationary portion 42 of the return flow path 20 that also forms an inner wall of the vacuum cavity 32. Walls 38 and 44 extend axially downstream and radially outwardly and are connected, and preferably welded, to wall 30.

The rotor shaft 16 is connected to a rotating radially inwardly disposed wall 48 which is located axially downstream of bearings 22, and which is connected to a rotating, axially extending caging wall 50. The caging wall 50 extends downstream, crosses a rotating portion 54 of the return flow path 20 which extends radially outwardly and then axially downstream into the rotor, and forms a rotating outer seat 58 for the seal. At least one opening 74 exists in wall 50, thereby permitting the return flow to enter the relative motion gap 28 from which the return flow enters the stationary portion 42 via the opening 72. Outer annular wall 52 and inner annular wall 56 of the rotating portion 54 of the return flow path 20 extend axially upstream from the rotor until winding radially inwardly and are connected, and preferably welded, to caging wall 50. The outer seat 58 extends axially downstream until turning radially inwardly and again axially downstream, thereby forming an outer tubular wall 60 of the rotating portion 15 of the supply flow path 14.

The seal 34 acts as a barrier between the supply and return flows. While a labyrinth seal 34 is preferred, any non-contact or low-contact seal could be implemented. Rotor shaft 16, wall 48, caging wall 50, outer seat 58 for the seal 34, and outer wall 60 of the rotating portion 15 of the supply flow path 14 define a rotating vacuum cavity 62 that is further bound by an outer wall (not shown) of the rotor 18 as is known in the art. The rotating portion 54 of the return flow path 20 is disposed within vacuum cavity 62 and extends axially upstream and radially inwardly, merging with the gap 28. Additionally, vacuum cavities 32 and 40 are further bound axially upstream by outer radial walls (not shown) between walls 30 and 44, and between walls 38 and 11 respectively. In the preferred embodiment, walls 30 and 44 defining vacuum cavity 32, and walls 38 and 11 defining vacuum cavity 40 are preferably made of stainless steel. However, any material that is capable of maintaining the vacuums may be used.

Because the return flow is only slightly warmer than the supply flow in FIG. 1, the efficiency of the system will not be materially adversely affected by the conduction to the supply flow path 14 from the return flow path 20 via the seal seats 36 and 58, and by possible small bypass flow from the supply flow to the return flow through the seal 34. The amount of heat loss due to conduction is a function of thickness and length of the return and supply tubes. Because the embodiment illustrated by FIG. 1 is designed to operate in systems in which the return flow is only slightly warmer than the supply flow, the length and thickness of the tubes are not critical. However, it is preferable to eliminate heat transfer that would otherwise increase the temperature of supply flow path 14 and return flow paths 20. For instance, vacuum cavity 62 eliminates heat transfer due to convection from the warm rotor shaft 16 to the rotating portion 54 of the return flow path 20 as well as gap 28, and additionally from the rotating portion of the return flow path to the rotating portion 15 of the supply flow path 14. Vacuum cavity 40 eliminates heat transfer due to convection between the stationary portion 42 of the return flow paths 20 and the stationary portion 13 of the supply flow path 14. Vacuum cavity 32 eliminates heat transfer due to convection between gap 28 and stationary portion 42 of the return flow path 20.

The relative motion gap 28 is formed between the rotating caging wall 50 and stationary outer wall 30 of vacuum cavity 32, and also extends radially outwardly between wall 48 and bearings 22. As the return flow re-enters the coupling 10 from the rotor 18, it will flow axially upstream within the rotating portion 54 of the return flow path 20, and will then flow radially inwardly towards the stationary portion 42 of the return flow path. After passing through opening 74, the return flow enters into the gap 28 during the radially inward path of travel, and then is forced through the opening 72 into the stationary portion 42 of the return flow path 20. The coolant that is disposed within the gap 28 is sealed from the ambient environment by bearings 22 and associated seals (not shown), thereby preventing leakage into the ambient environment.

Because the bearings 22 are in contact with the ambient environment, they are typically going to be at room temperature. As a result, a large temperature gradient will exist (on the order of 300° K.) at the gap 28 as the helium will be warmest at a point adjacent the bearings 22 and will become cooler as the gap extends axially downstream towards the towards the radially extending portion of the return flow path 20. Therefore, in order to decrease the heat leak into the coupling, the walls 30 and 50 are made thin and the gap 28 is made small.

As the gap 28 extends axially upstream from return flow path 20 and turns radially outwardly adjacent the bearings 22, it does not again extend axially downstream (which would be the reverse direction of the preexisting axially upstream direction of extension). The gap 28 therefore changes direction by only approximately 90 degrees and does not reverse its direction of extension. Additionally, any straight line extending radially outwardly and perpendicularly from axis a—a will cross the gap 28 only once. As a result, the need for additional seals and inserts further directing the travel of the gas through the gap is advantageously eliminated.

While the return flow path 20 comprises annular stationary and rotating portions 42 and 54, it could alternatively comprise a plurality of individual stationary and rotating tubes. In this case, the stationary return tubes would be disposed within a single vacuum cavity bound by wall 30, inner seat 36, and wall 11.

Figure 4:
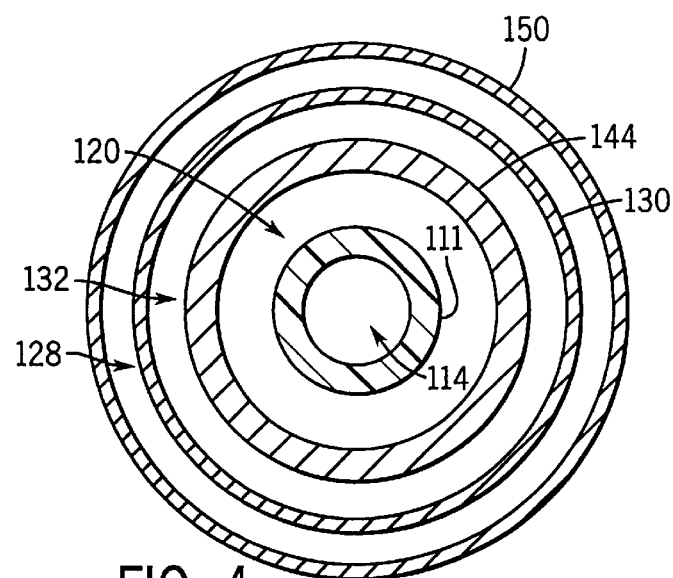
FIG. 4 shows a sectional end elevation view of a cryogenic transfer coupling of constructed in accordance with another alternate embodiment of the invention.

An alternate embodiment of FIGS. 1 and 3 is shown in FIG. 4 in which reference numerals of like elements have been incremented by 100. Turning to FIG. 4, vacuum cavity 40 has been eliminated and replaced with a low conductivity plastic or composite wall 111 that is sufficiently thick to serve as a thermal barrier between the return flow path 120 and supply flow path 114. Stainless steel vacuum jacket 144 forms the outer wall of the return flow path 120 and is surrounded radially outwardly by vacuum cavity 132. Gap 128 is disposed radially outwardly from the vacuum cavity 132 and is bound by inner stainless steel wall 130, and outer rotating caging wall 150.

Figure 5:
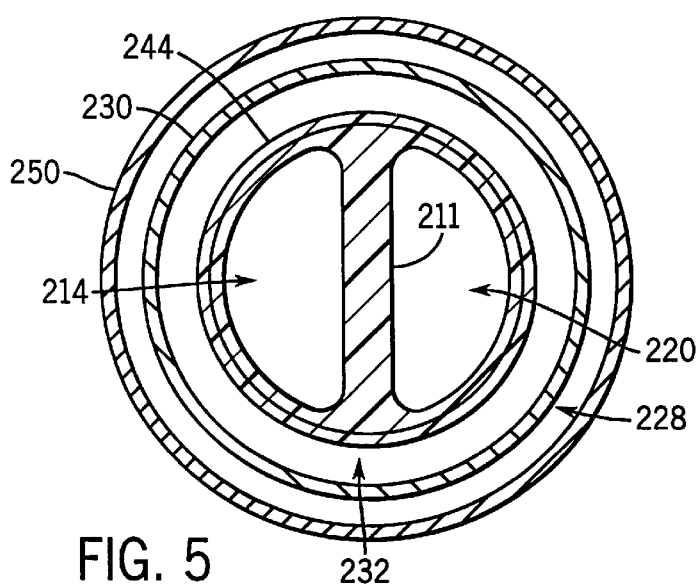
FIG. 5 shows a sectional end elevation view of a cryogenic transfer coupling of constructed in accordance with another alternate embodiment of the invention.

Another alternate embodiment of FIGS. 1 and 3 is illustrated in FIG. 5, in which reference numerals of like elements have been incremented by 200. Instead of the return flow path 120 being coaxial with the supply flow path 114 as in FIG. 4, supply flow path 214 and return flow path 220 are shown in a side-by-side orientation in FIG. 5 as being separated by a low conductivity plastic or composite wall 211 that has sufficient thickness to serve as a thermal barrier between the return and supply flow. A stainless steel metal jacket 244 surrounds wall 211 and forms the inner wall of vacuum cavity 232. Stationary stainless steel outer wall 230 of vacuum cavity 232 also forms the inner wall of gap 228, which is surrounded by rotating outer caging wall 250.

Figure 2:
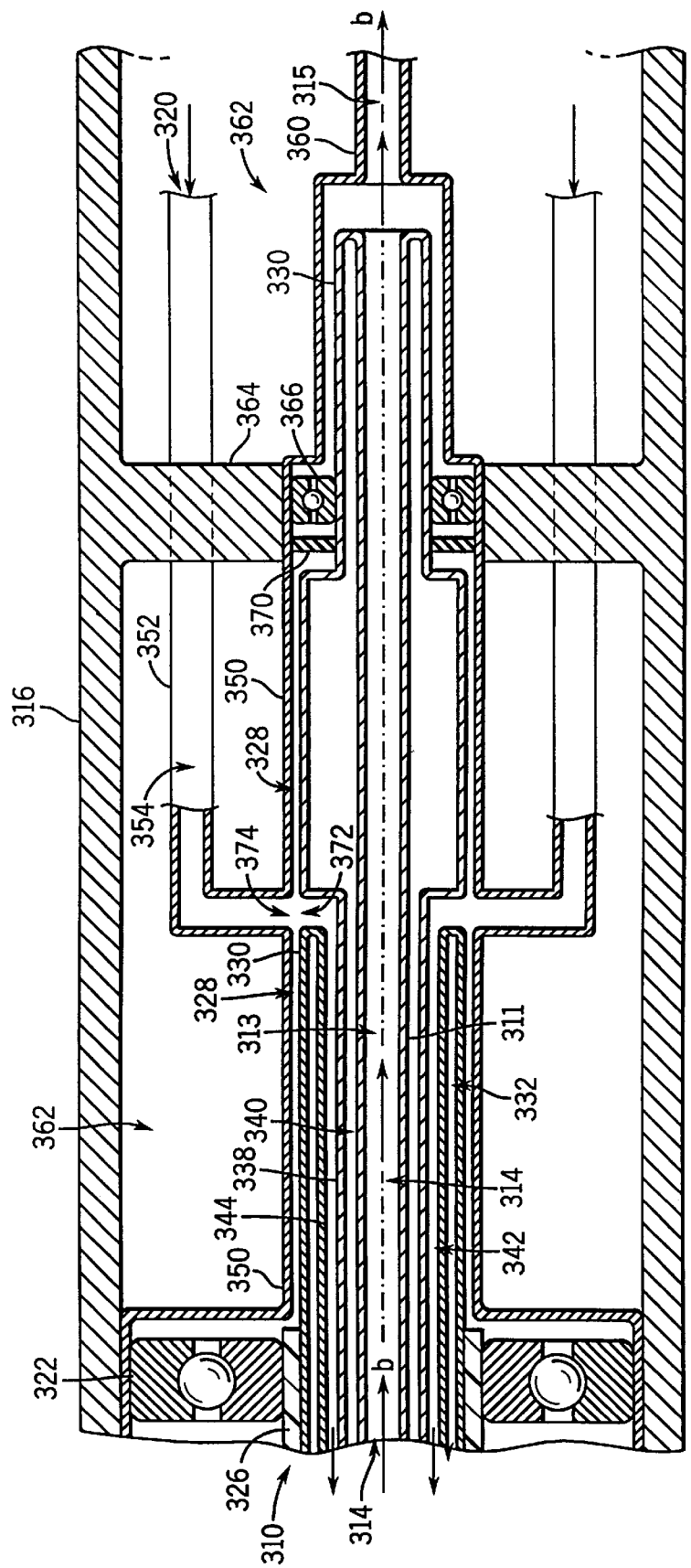
FIG. 2 shows a fragmentary side sectional elevation view of a rotor having a cryogenic transfer coupling constructed in accordance with an alternate embodiment of the invention.

A cryogenic rotary transfer coupling 310 in accordance with an alternate embodiment is shown in FIG. 2, in which reference numerals of like elements from FIG. 1 have been incremented by 300. Hence, cryogenic transfer coupling 310 comprises a supply flow path 314 connected to a cryogenic cooler that circulates a cryogenic coolant through a rotor shaft 316, thereby cooling superconducting coils in the rotor, and returning the coolant to the cooler through return flow path 320. Supply flow path 314 comprises a stationary portion 313 having an outer wall 311, and a rotating portion 315 having an outer wall 360. Wall 311 also defines a radial inner wall of a vacuum cavity 340. Vacuum cavity 340 has a stationary radial outer wall 338 also serves as a radial inner wall for a stationary portion 342 of the return flow path 320 that is surrounded by wall 344. Wall 344 also defines the inner wall of a vacuum cavity that is surrounded by a stationary outer wall 330. Wall 330 extends axially downstream past the return flow path 320 and inner wall of the bearing 366 until ultimately connecting with wall 311. At least one opening 372 exists in wall 330 at the point where it crosses the return flow path 320.

The rotor shaft 316 contains a rotating caging wall 350 that is disposed between the shaft and bearing 322, and on a rotating support 364 that is disposed between the shaft 316 and bearing 366. The radially inward wall of bearing 322 rests on a tube 326 that surrounds a portion of wall 330 and that works in conjunction with caging wall 350 and the seal (not shown) associated with the bearing 322 to form a seal for the gap 328 formed between stationary wall 330 and the caging wall 350. Caging wall 350 extends axially downstream between and beyond support 364 and bearing 366 until turning radially inwardly and again extending axially downstream to form the rotating outer wall of the rotating portion 315 of the supply flow path 314. Caging wall 350 includes an opening 374 at the point where it crosses the return flow path 320. After passing through opening 374, the return flow enters into the gap 328 during the radially inward path of travel, and then is forced through the opening 372 into the stationary portion 342 of the return flow path 320.

The rotating portion 354 of the return flow path 320 is preferably at least one tube 352 passing through an opening in rotating support 364 and radially inwardly bent and is connected and preferably welded to caging wall 350 at the opening 374. A rotating vacuum cavity 362 is defined by the rotor shaft 316, caging wall 350, wall 360, and an axially downstream radially oriented wall (not shown) of the rotor through which the rotating portions 352 and 315 of the return flow paths 320 and supply flow path 314 respectively extend.

Return flow path 320 is shown as comprising stationary annulus 342 and rotating tube 352. Alternatively, as described in conjunction with the embodiment of FIG. 1, a plurality of return tubes could replace the annulus 342. In this embodiment, a single stationary vacuum cavity would be defined by walls 330 and 311.

The embodiment of FIG. 2, as will be described below, is designed to accommodate heat exchangers in the rotor whose return flow is significantly warmer than the supply flow. However, it may also be used when the return flow is only slightly warmer than the supply. The arrangement in accordance with this embodiment seeks to minimize heat transfer between the return flow path 320 and the supply flow path 314 resulting from conduction as well as convection. Vacuum cavity 354 prevents heat transfer resulting from convection between the shaft 316 and the rotating portion 354 of the return flow path 320, and from the rotating portion of the return flow path to the rotating portion 315 of the supply flow path 314 as well as gap 328. Vacuum cavity 340 prevents heat transfer in the form of convection from the stationary portion 342 of the return flow path 320 to the stationary portion 313 of the supply flow path 314, and also from the gap 328 in the stationary portion of the supply flow path. Vacuum cavity 332 prevents heat transfer in the form of convection from gap 328 to the stationary portion 342 of the return flow path 320. Heat transfer in the form of conduction between the supply flow path 314 to the return flow path 320 is also minimized. Additionally, walls 350, 338, and 330 are may be made of stainless steel with a low conducting plastic or composite material sandwiched inside to reduce conductive heat transfer along these walls. Additionally, the embodiment of FIG. 2 shows the return flow path 320 as being separated from the supply flow path 314 by a greater distance than in the embodiment of FIGS. 1 and 3. In addition, because the walls 350, 330, and 338 are of minimal thickness, the embodiment of FIG. 2 is designed to accommodate cooling systems in which the temperature differential between the return flow and the supply is greater than in the embodiment of FIGS. 1 and 3. These features thereby increase the overall efficiency of the system.

Parasitic heat loss will occur in the gap 328 at the point where it is transferred from the stationary portion 313 to the rotating portion 315. This supply flow is sealed from the return flow portion of the gap 328 by the seal 370 which is associated with the bearing 366. As the return flow travels from the rotating portion 354 to the stationary portion 342, it enters the gap 328 and then is forced into stationary portion 342 of the return flow path 320. The return flow gap is sealed by walls 350, bearing 322, and wall 326 axially upstream, and axially downstream by associated bearing 366 and associated seal 370. Because the temperature of bearings 322 and 366 will be approximately that of the outside environment, a temperature distribution will form within the return flow portion of the gap 328, and will have its warmest portions adjacent the bearings and cooling as the gap extends from each bearing toward the return flow path 320. Likewise, the supply flow portion of the gap 328 will be warmest adjacent bearing 366 and will cool as the gap extends towards the supply flow path 314.

As in the embodiment illustrated in FIG. 1, the gap 328 is designed such that any straight line extending radially outwardly and perpendicularly from the axis of rotation b—b will cross the gap no more than once. Again, no reversal of the annulus formed by gap 328 in the axial direction is present in this embodiment, thereby simplifying the manufacturing of the coupling 310.

Many changes and modifications may be made to the invention without departing from the spirit thereof. The scope of the changes will become apparent from the appended claims.

I claim:

1. An apparatus for circulating a cryogenic fluid through a rotor of a rotating superconducting electromechanical device having an axis of rotation, comprising:
   a supply flow path extending into a rotor shaft and configured to supply the cryogen to said rotor;
   a return flow path extending from said rotor and configured to return the cryogen to a cooling device; and
   a rotating portion and a stationary portion of said apparatus defining a relative motion gap therebetween, wherein any straight line extended radially outwardly and perpendicularly from said axis of rotation intersects said gap no more than once.

2. The apparatus of claim 1, wherein the supplied cryogen comprises gaseous helium.

3. The apparatus of claim 1, wherein said gap extends in an axial direction without reversal of said axial direction of extension.

4. The apparatus of claim 1, further comprising a first vacuum space disposed between said return flow path and said supply flow path.

5. The apparatus of claim 4, further comprising a second vacuum space disposed between said return flow path and said gap.

6. The apparatus of claim 5, further comprising a caging wall and an outer wall of said rotor shaft, and a third vacuum space disposed between an area formed by said caging wall and said outer wall of said rotor shaft, wherein a portion of said return flow path is disposed within said third vacuum.

7. The apparatus of claim 1, wherein said supply flow path includes a seal disposed between a stationary portion and a rotating portion to minimize flow leakage from the supply flow path to the return flow path.

8. An apparatus for circulating a cryogen through a rotor of a rotating high temperature superconducting electromechanical device
   a cryogenic cooler;
   a supply flow path connected to said cryogenic cooler and configured to supply said cryogen to said rotor, wherein said supplied cryogen includes gaseous helium;
   a return flow path connected to said cryogenic cooler and to said supply path, and configured to return said cryogen to said cryogenic cooler, wherein said return flow path said returned cryogen comprising gaseous helium; and a rotating portion and a stationary portion defining a relative motion gap disposed therebetween, wherein said gap extends at least in an axial direction without reversal in said axial direction.

9. The apparatus of claim 8, wherein said returned cryogen is warmer than said supplied cryogen by less than approximately 10 degrees Kelvin.

10. The apparatus of claim 8, wherein said supply flow path comprises a rotating portion disposed within a rotor and a stationary portion connected to said cryogenic cooler.

11. The apparatus of claim 8, wherein said return flow path comprises a rotating portion disposed within a rotor, and a stationary portion connected to said cryogenic cooler.

12. The apparatus of claim 8, wherein said supplied cryogen includes gaseous helium at a temperature no less than substantially 30 degrees Kelvin.

13. A cryogenic transfer coupling for circulating a cryogen through a rotor of a rotating superconducting electromechanical device, comprising:

a supply flow path connected to a cryogenic cooler at one end, and containing a cryogen and extending into said rotor and configured to cool at least one rotor winding at a second opposite end of said supply flow path;

a return flow path connected to said supply flow path at a first end and to said cryogenic cooler at a second, opposite end, said return flow path being configured to return said cryogen from said rotor to said cryogenic cooler; and a stationary portion and a rotating portion of said coupling separated from each other by a relative motion gap defining a pathway, wherein said pathway extends at least axially without reversal in the axial direction along an entire length thereof.

14. The apparatus of claim 13, wherein said rotor further comprises an axis of rotation, and wherein said gap is constructed such that any straight line extending radially outwardly and perpendicularly from said axis crosses said gap no more than once.

15. A rotating superconducting electromechanical device comprising:

a rotor shaft;

a rotor mounted on said rotor shaft so as to rotate therewith and having at least one superconducting winding;

a cryogenic cooler;

a supply flow path connected to said cryogenic cooler at a first end and extending into said rotor shaft to cool said at least one superconducting winding disposed within said rotor at a second, opposite end, wherein said rotor shaft rotates about an axis of rotation, said supply flow path including a stationary supply flow path portion and a rotating supply flow path portion;

at least one return flow path connected to said supply flow path at a first end, and to said cryogenic cooler at a second, opposite end, wherein said return flow path includes a rotating return flow path portion and a stationary return flow path portion;

a stationary wall disposed radially outwardly from an outer wall of said return flow path, wherein a vacuum space exists between said stationary wall and said outer wall;

a caging wall defining a vacuum space disposed generally axially adjacent said at least one set of bearings; and a relative motion gap having a direction of axial extension that does not reverse said direction of axial extension.

* * * * *